May 14, 1940.  A. C. LINDGREN  2,200,777
TRACTOR IMPLEMENT ATTACHMENT
Filed Oct. 7, 1938   2 Sheets-Sheet 1
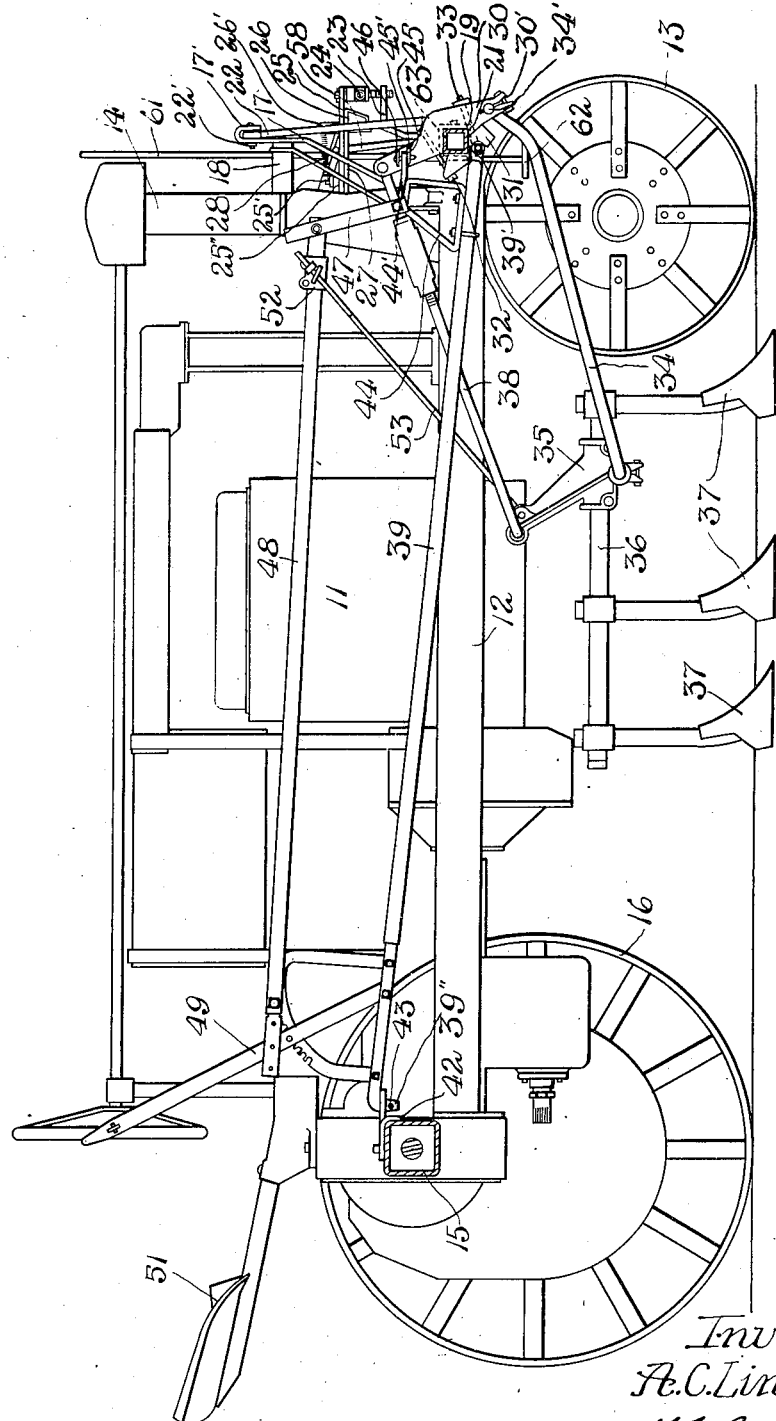

May 14, 1940.  A. C. LINDGREN  2,200,777
TRACTOR IMPLEMENT ATTACHMENT
Filed Oct. 7, 1938  2 Sheets-Sheet 2
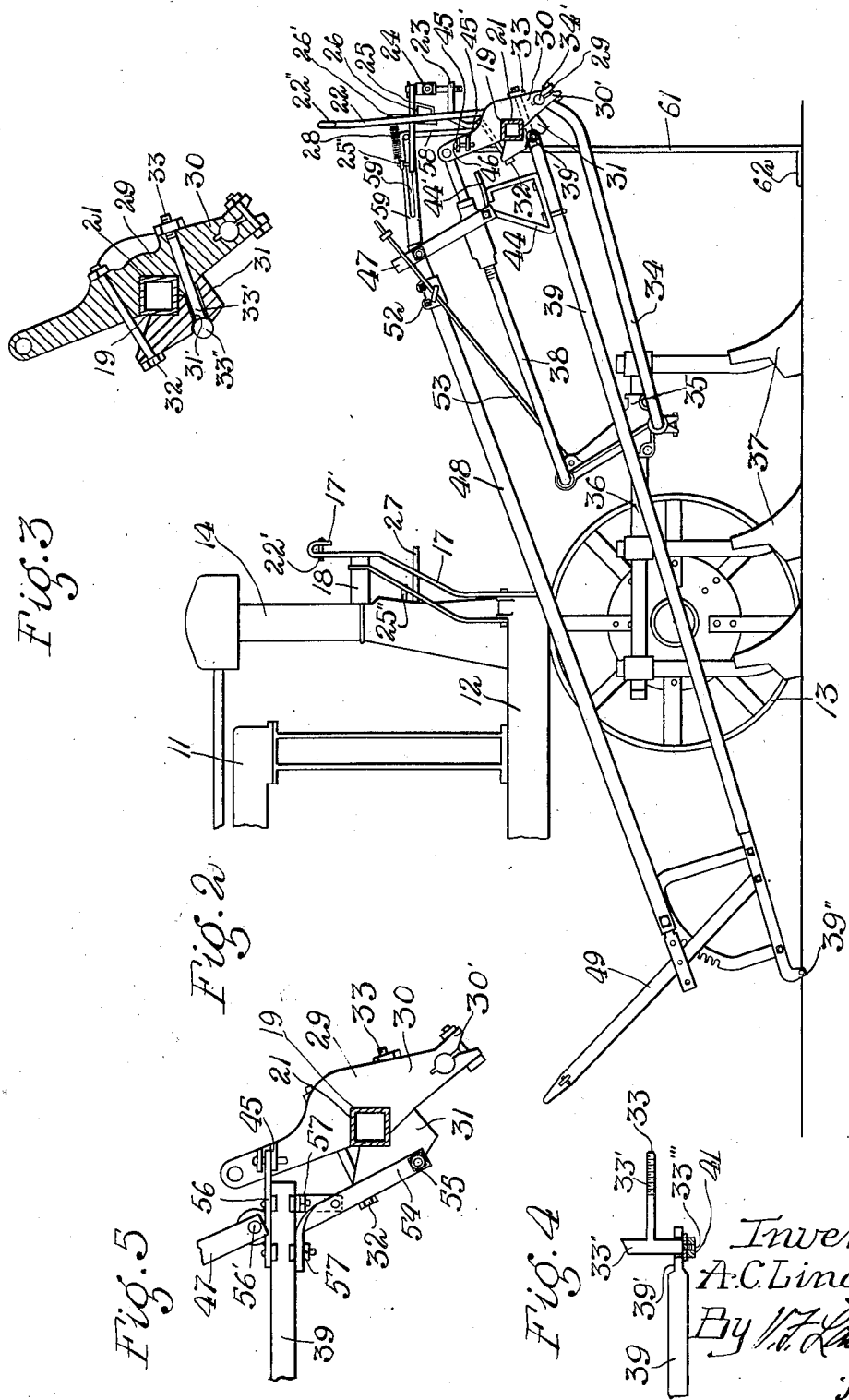

Patented May 14, 1940

2,200,777

UNITED STATES PATENT OFFICE 2,200,777

TRACTOR IMPLEMENT ATTACHMENT

Alexus C. Lindgren, Chicago, Ill., assignor to International Harvester Company, a corporation of New Jersey Application October 7, 1938, Serial No. 233,709

11 Claims. (Cl. 97—47)

This invention relates to direct connected tractor implement attachments and particularly to the type of attachment which is quickly attachable to and removable from the tractor. Further, it relates to a self-supporting type of implement attachment, which, upon being detached from the tractor is supported on the ground in the same vertically alined position that it was on the tractor, so that it is left in a position ready for easy attachment of the same to the tractor upon the tractor being moved into engagement therewith.

It is the object of the invention to provide an implement of the self-supporting type which will be steady and stable when supported by itself detached from the tractor.

It is another object of the invention to provide an attachment wherein it is only necessary to aline minimum elements upon bringing the tractor into position with the attachment for connecting the same thereto.

It is another object of the invention to provide novel means for attaching the usual push beams adapted to extend along the sides of the tractor to the transverse tool-carrying means extending transversely across the front of the tractor when attached thereto.

In general, the invention is in a tractor implement attachment comprising a transverse tool-carrying means to which the tools are attached for pivotal movement about the same, and push beams adapted to extend along the sides of the tractor for connection to the tractor at the rear thereof, wherein the forward ends of the same are hingedly connected to the transverse tool means, so that, upon removing the implement attachment from the tractor, first having lowered the vertical supporting means carried by the transverse tool means, the beams may be removed from the tractor and lowered so that their rear ends rest on the ground. When the beams are in position with their rear ends attached to the tractor, the forward end is latched at a location vertically spaced from the hinged connection thereto, so that, when the push beam is on the tractor, the tool-carrying means will be prevented from twisting or rotating due to the drag by the working tools. In the forming of this hinged connection of the push beam with the transverse tool-carrying means, a novel hinge connection, making the same as simple in construction as possible, is made to a clamping bolt which serves to fasten the vertically-extending bracket to a transverse tool bar.

For a better understanding of the invention, reference may be had to the following detailed description taken in connection with the accompanying drawings, in which:

Figure 1 is a side elevational view of a tractor with the implement attachment embodying the present invention attached thereto;

Figure 2 is a side elevational view, showing the arrangement of the parts of the implement attachment in its detached position;

Figure 3 is an enlarged sectional view, in elevation, of the vertically-extending bracket to illustrate the form of one of the clamping bolts thereof;

Figure 4 is a detailed plan view of the hinge connection of the push beam in its connection to the clamping bolt; and, Figure 5 shows a modified form of the hinge connection of the forward end of the push beam to the vertically-extending bracket.

Referring now to Figures 1 and 2, there is shown a tractor, indicated generally at 11, having longitudinally extending side sills 12, forward steerable wheels 13 operated through a steerable head 14 on the forward end of the tractor, and a rear axle portion 15 through which extends a means for driving rear tractor wheels 16.

The forward ends of the sill members 12 have means for the attachment of a separable overhanging bracket attaching means 17, that extends vertically and is braced to the steerable head 14 by bracing means 18. The implement attachment, in connection with which the present invention is illustrated, is of the pendulum or laterally shifting type, wherein the transverse tool-carrying means may be shifted laterally through means associated with the steerable head means to effect dodging of the plants as the tractor with the implement attachment passes through the rows being cultivated. The separable bracket and an implement attachment of the pendulum type, to which the present invention is being applied, is illustrated more in detail in the Patent No. 2,115,387 to W. S. Graham et al., and reference may be had thereto.

This attachment comprises, in general, a transverse tool-carrying means, indicated generally at 19, which, in turn, consists of a transversely extending tool bar 21, being square in cross section, and two vertically extending swinging arms 22 pivotally connected at their lower ends therewith and adapted to pivotally connect, at their upper ends, with inverted U-shaped portions 17' of the over-hanging bracket 17. The connection is made with these portions 17' of the over-hanging bracket by means of a bolt 22' extending through eye portions 22″ on the upper ends of the arms 22. When the swinging arms 22 are so connected to the over-hanging bracket 17, the transverse tool-carrying means 19 can have swinging movement or lateral shifting movement across the forward end of the tractor.

Extending vertically and forwardly on the transverse bar 21 is a rigid projection 23 on the top of which is connected a laterally extending adjustable link 24 for pivotal connection to the forward end on a longitudinally extending arm 25 having at its rear end a vertically extending bolt 25′, which, in turn, is adapted to fit an end slot in a projection 25″ on the stationary part of the steerable head means 14 upon the cultivator being attached to the tractor, and to permit pivoting of the same thereabout, and said arm 25 having clutch means 26 including a vertically pivoted member 26′ for clutching connection with an end slot in the forward end of a shifting arm 27 adapted to be swung right and left by the movable steering part of the steerable head means 14. This means 26 is normally held in clutching engagement with the arm 27 by a spring 28 made fast at one end of the vertical bolt 25′. This clutch means 26 can be held out of engagement with the shifting arm 27 when the cultivator tools are raised with relation to the tractor by a means to be described later.

On the transverse tool bar 21, there are mounted vertically extending brackets 29 comprising a main bracket portion 30, a clamping plate portion 31, and clamping bolts 32 and 33 between the two for rigidly holding the bracket on the tool bar 21. On the lower end of the main bracket portion 30 is a bifurcated portion 30′, to which may be connected a transversely extending portion 34′ of a main drag link 34 for pivotal movement therewith, and connected at its rear end is a tool beam bracket 35 having a tool beam 36 with the cultivator tools 37 connected thereto in spaced relation. At the upper end of the main bracket portion 30, there is connected an adjustable link 38 extending rearwardly, substantially parallel to the drag link 34 and pivotally connected to the upper end of the tool beam bracket 35. It should thus be seen that the tool beam 36 with its tools may be pivoted about the vertically extending bracket 29.

The clamping bolt 33 is of special form, as shown more clearly in Figures 3 and 4. It is substantially T-shaped and its main threaded portion 33′ is adapted to extend through an enlarged opening 31′ of the clamping plate 31 and through the main bracket portion 30. The head 33″ extends transversely and has a threaded portion 33‴. When the bolt 33 is rigidly tight in the bracket 29, this portion 33‴ forms a pivot on which push beams 39 may be connected. In the form shown in Figures 1, 2 and 4, the forward end of the push beams has a flattened portion 39′ having a hole therethrough substantially larger than the portion 33″ of the T-shaped bolt 33, so that some lateral movement may be permitted between the end of the push beam 39 and the bracket 19. The end portion 39′ is held on the head portion 33″ by a washer and nut means 41 on the threaded portion 33‴ thereof. There is thus provided a hinge connection means for connecting the beam to the bracket 29.

On the top of the rear axle 15, there is connected a plate 42 having a hole therein for the attachment of a bent-over portion 39″ on the rear end of the push beam 39, and it is held fast therein by a cotter pin 43 extending through the portion 39‴.

On the forward end of the push beams 39 is rigidly connected an upwardly extending bracket 44, which has a forwardly extending portion 44′ adapted to be latched to the upper end of the main bracket portion 30 by means 45 thereon vertically spaced above the hinge connection and consisting of lug portions 45′ and a pin 46 adapted to extend through holes in the portions 45 and through a hole in the portion 44′ of the bracket 44, all of which form a latch or retaining means for making the hinge connection ineffective when the beam is in a raised position. When in the latched position, such as shown in Figure 1, any twisting or rotating movement of the transverse tool-carrying means 19, due to the drag of the cultivator tools through the link 34 pulling on the lower end of the bracket 29, is prevented, though, at the same time, the lateral shift of the transverse tool-carrying means 19 across the forward end of the tractor is permitted. The transverse tool-carrying means 19 is thus maintained rigidly in its vertical position by the push beams the same as when the hinge connection was not used.

To effect adjustment or lifting of the tool beams 36 about the brackets 29, there is provided a vertically extending lifting lever 47 pivoted on the upwardly extending bracket 44 on the forward end of the push beam 39 for fore and aft movement. This lever 47 is actuated through a lifting pipe 48 operated by quadrant and lever means 49 carried by the rear end of the push beam 39 and accessible to the operator's station 51 on the tractor. On the forward end of the lifting pipe 48 is provided means 52 for the connection of a lifting link 53 pivotally connected to the tool beam bracket 35 and to the means 52 on the lifting pipe 48, so that, when the lifting lever 47 is moved about its pivot in either a fore or an aft direction, an adjustment of the tools about the bracket 29 will be effected. Movement of the lifting lever 47 forwardly will raise the working tools 37 off the ground and return movement will lower them to the ground.

In Figure 5 is shown a modified form of a bracket structure on the forward end of the push beam 39 for its attachment to the bracket 29. Instead of the push beam itself being hingedly connected to the T-bolt 33, as shown in the other figures, there is provided a downwardly extending portion 54, which is pivotally connected to the T-bolt at 55. On the top of the forward end of the bush beam 39 is a forwardly extending plate 56 having a hole therein and adapted to be latched by latching means 45 on the bracket 29. The plate 56 and the downwardly extending portion 54 are made rigid with the end of the push beam by clamping bolts 57. In this instance, the lifting lever 47 is pivotally mounted at 56′ on the plate 56. With this form of connection, the push beam may take a more horizontal position with respect to the tractor than with the form shown in Figures 1 to 4.

In order automatically to detach the implement from operation by the movable part of the steering head means 14 and from the arm 27 upon the implement tools being raised out of the ground, there is provided a vertically extending arm means 58 pivoted transversely on the tool bar 21 and adapted to be connected with a lost-motion slide element 59 connected to the left-hand lifting lever 47 to be moved for and aft therewith. This slide member 59 has a longitudinally extending slot 59' therein, the rearward end thereof adapted to engage a transversely extending portion on the upper end of the arm means 58 to pivot the same to cause another spaced portion of the arm means 58 to bring the clutching element 26', upon raising of the working tools, automatically out of clutch contact with the end of the arm 27, thus freeing the transverse tool-carrying means 19 from the movable part of the steerable head means 14 to permit the tractor to turn about without acting upon the same. When the tractor has been turned about and the implements are lowered, the movable arm 27 will be straightened and alined with the clutch element 26' of the means 26 for engagement with the same to again effect steering of the tool-carrying means 19 for the purpose of dodging plants in the plant rows.

To effect removal of the implement from the tractor, supports 61 having feet 62 thereon are lowered to the ground and held fast by a U-shaped clamping means 63 on the transverse tool bar 21. There is one of these supporting means at each end of the transverse bars. Once these are in position, the bolts 22' retaining the swinging arms 22 in the U portion 17' of the overhanging brackets 17 may then be removed and the swinging arms 22 swung to the side thereof. Next, the pins 46 for unlatching the brackets 44 from the bracket portion 29 may be removed, and then, upon removing the cotter pins 43 from the bent-down ends 39'' of the push beams 39, the rear ends of the push beams may be removed from the plates 42 on the rear axle housing and the beams hinged about the T-bolt and lowered to a position of rest on the ground. The tractor with the over-hanging supporting bracket 17 may now be backed out of the attachment and the attachment will be left standing in substantially the same position that it was upon the tractor and ready for the tractor to be quickly reconnected to the same.

For connecting the attachment to the tractor, the reverse operation is performed. The tractor is wheeled into the attachment so that the portion 17' can be alined with the upper portions 22'' of the swinging links 22 and so that the end of the arm 27 is clutched with the member 26' of the clutch means 26. The push beams may be lifted and inserted at the rear of the tractor and then latched at their forward ends to the bracket 19. The support means 61 may be raised and the implement will then be connected to the tractor.

It should now be seen that there has been provided an implement attachment of the quick attachable, self-supporting type which is simple in construction and in which the parts are so arranged that, when the implement attachment is detached, it will be stable and steadily supported.

While various changes may be made in the construction shown herein, it will be understood that such changes shall be made without departing from the spirit and scope of this invention as defined in the appended claims.

What is claimed is:

1. A ground-working implement adapted to be directly connected to a tractor, the implement comprising a transverse tool-carrying means, spaced longitudinal beam members connected to the transverse tool-carrying means for vertical pivotal movement with respect thereto, and means forming a part of each beam member and associated with said transverse tool-carrying means for fixing the respective beam member and tool-carrying means against relative vertical pivotal movement when the implement is attached to the tractor.

2. A ground-working implement of the lateral shifting type adapted to be directly connected to a tractor, the implement comprising a transverse tool-carrying means, spaced longitudinal push beams connected to the tool-carrying means for vertical pivotal movement and for lateral pivotal movement, and means for preventing vertical pivotal movement between the push beams and the tool-carrying means when the implement is attached to the tractor but permitting lateral pivotal movement between the same.

3. A ground-working implement attachment adapted to be connected to and pushed by a tractor, said attachment comprising a transverse tool-carrying means, spaced longitudinal push beams hingedly connected to the transverse means, means associated with the end of each push beam and with the transverse tool-carrying means for latching them together when the implement is attached to the tractor, the free ends of the push beams adapted to be detachably connected to the tractor when the implement is to be pushed thereby and to be dropped to the ground upon unlatching the push beam and tool-carrying means when the implement is detached to serve as steadying means for the implement, and means for vertically supporting the transverse tool-carrying means upon being detached from the tractor.

4. In combination, a tractor having means for attaching an implement thereto, an implement attachment adapted for quick attachment to the tractor attaching means comprising a tool-carrying means with the tools thereon adapted to extend transversely with respect to the tractor when attached thereto, support means adapted to be associated with the tool-carrying means to support the same when the implement is not attached to the tractor, push beams adapted to extend along the sides of the tractor and to have their rear ends removably attached thereto, means for hingedly connecting the push beams to the tool-carrying means, so that when the implement is removed from the tractor to be supported by the support means the rear ends of the push beams may be lowered, and means associated with the end of each beam and with the transverse tool-carrying means for latching them together when the implement is attached to the tractor but permitting unlatching when the implement is detached from the tractor.

5. In combination, a tractor having means for attaching an implement thereto, an implement attachment adapted for quick attachment to the tractor attaching means comprising a tool-carrying means with tools thereon adapted to extend transversely with respect to the tractor when attached thereto, support means adapted to be associated with the tool-carrying means to support the same when the implement is not attached to the tractor, push beams adapted to extend along the sides of the tractor and to have their rear ends removably attached thereto, said transverse tool-carrying means including vertically extending brackets having two vertically spaced means for the connection of the forward ends of the push beams thereto, means associated with the forward ends of the beams for cooperating with the two vertically spaced means, one of the spaced means in its connection with a beam permitting of vertical pivoting of the beam when the same is disconnected from the other vertically spaced means and from the tractor, the other of the spaced means including latch means which upon being unlatched will permit the push beam to pivot about the one of the vertically spaced means upon removing the rear ends of the beams from their connection with the tractor whereby the rear ends of the push beams may be lowered to a position of rest when removing the implement from the tractor.

6. In combination, a tractor having means for attaching an implement thereto for lateral shifting movement, an implement of the lateral shifting type adapted for quick attachment to the tractor attaching means comprising a tool-carrying means with tools thereon adapted to extend transversely with respect to the tractor when attached thereto, support means adapted to be associated with the tool-carrying means to support the same when the implement is not attached to the tractor, push beams adapted to extend along the sides of the tractor and to have their rear ends removably attached for lateral pivotal movement with respect thereto, said transverse tool-carrying means including two vertically spaced means for the connection of the push beams thereto, both of which permit of lateral pivoting of the forward ends of the beams therewith, means associated with the forward ends of the beams for cooperating with the two vertically spaced means, one of the spaced means in its connection with a beam permitting of vertical pivoting of the beam when the same is disconnected from the other vertically spaced means and from the tractor, the other of the spaced means including latch means which, upon being unlatched, will permit the push beam to pivot about the one of the vertically spaced means upon removing the rear ends of the beams from their connection with the tractor, whereby the rear ends of the push beams may be lowered to a position of rest when removing the implement from the tractor.

7. In an implement of the type adapted for quick attachment to a tractor, a tool-carrying means adapted to extend transversely with respect to the tractor, push beams adapted to extend along the sides of the tractor, vertically extending brackets carried by the tool-carrying means, means for hingedly connecting the forward ends of the push beams to the vertically extending brackets for vertical pivotal movement relative thereto, and means associated with the end of the push beams and with the bracket at a location vertically spaced from the hinged connecting means for latching the beams to the bracket in one of its hinged positions.

8. In an implement of the type adapted for quick attachment to a tractor, a tool-carrying means adapted to extend transversely with respect to the tractor, push beams adapted to extend along the sides of the tractor, vertically extending brackets carried by the tool-carrying means, comprising a main bracket portion, a clamping plate portion, and clamping bolts between the two portions, one of the clamping bolts serving to provide means for hingedly connecting the forward ends of the push beams to the brackets for vertical pivotal movement relative thereto, and means associated with the forward end of each push beam and with the respective bracket at a location vertically spaced from the hinged connection means for latching the beam to the bracket in one of its hinged positions.

9. In an implement of the type adapted for quick attachment to a tractor, a tool-carrying means adapted to extend transversely with respect to the tractor, push beams adapted to extend along the sides of the tractor, vertically extending brackets carried by the tool-carrying means, means for hingedly connecting the forward ends of the push beams to the vertically extending brackets for vertical pivotal movement relative thereto, and means for latching each beam to its bracket in one of its hinged positions including a vertically extending bracket mounted on the forward end of each push beam.

10. In an implement of the type adapted for quick attachment to a tractor, a tool-carrying means adapted to extend transversely with respect to a tractor, support means for the tool-carrying means to support the same when the implement is not attached to the tractor, push beams adapted to extend along the sides of the tractor, means for hingedly connecting the push beams to the tool-carrying means to permit moving of each push beam from one position to another position, and means for retaining each beam in one of its hinged positions.

11. In an implement of the type adapted for attachment to a tractor, a tool-carrying means adapted to extend transversely with respect to the tractor and to connect to one portion of the tractor, support means for the tool-carrying means to support the same when the implement is not attached to the tractor, beam members adapted to extend along the sides of the tractor, means for hingedly connecting the beam members to the tool-carrying means to permit movement of the same from one position to another position, and means for retaining each beam in one of its hinged positions.

ALEXUS C. LINDGREN.